United States Patent [19]

Tang et al.

[11] Patent Number: 5,463,558
[45] Date of Patent: Oct. 31, 1995

[54] METHOD FOR DESIGNING A BINDER RING SURFACE FOR A SHEET METAL PART

[75] Inventors: Sing C. Tang, Plymouth; Maurice M. K. Lou, Canton; Thomas J. Balun, Sterling Heights, all of Mich.

[73] Assignee: Ford Motor Company, Dearborn, Mich.

[21] Appl. No.: 191,696

[22] Filed: Feb. 4, 1994

[51] Int. Cl.⁶ .................................................. G05B 19/18
[52] U.S. Cl. .......................... 364/472; 364/476; 29/34 R; 72/379.2
[58] Field of Search ......................... 364/474.15, 474.16, 364/472, 476, 474.02, 474.07; 72/347, 379.2; 29/11, 34 R, 33.5, DIG.11

[56] References Cited

U.S. PATENT DOCUMENTS

| | | | |
|---|---|---|---|
| 5,128,877 | 7/1992 | Tang | 364/476 |
| 5,379,227 | 1/1995 | Tang et al. | 364/472 |
| 5,390,127 | 2/1995 | Tang et al. | 364/472 |

OTHER PUBLICATIONS

"Detection and Elimination of Wrinkles on an Auto-Body Panel by the Binder Set Analysis", SAE Technical Paper 930515, by Ling, Lou and Tang, Mar. 1, 1993.
"Analysis of Sheet Metal Stamping by a Finite-Element Method", Journal of Applied Mechanics, vol. 100, No. 1, Mar. 1978, pp. 73–82.
"Sheet Metal Forming Modeling of Automobile Panels", article by Tang, Gress & Ling, 15th Biennial Congress Int'l Deep Drawing Research Group, May 16, 1988.
"Evaluation Methods of Press Forming Severity in CAD Applications", Computer Modeling Sheet Forming Process, edit by Wang and Tang, The Metallurgical Soc. pp. 37–50, 1985.

Primary Examiner—James P. Trammell
Attorney, Agent, or Firm—Roger L. May; Joseph W. Malleck

[57] ABSTRACT

Method for aiding sheet metal forming tool design, for use with a computer including memory, and forming tools including a draw die, punch and binder having surfaces designed to form the sheet metal into a part, the sheet metal being represented as a mesh including a plurality of nodes. The method includes evaluating an initial binder-set associated with an initial binder surface design during a first stage of forming the sheet metal in which at least one of the plurality of sheet metal mesh nodes is forced against the binder surface, and detecting an area of unacceptable deformation on the sheet metal mesh. The method also includes identifying the at least one of the plurality nodes forced against the binder surface associated with the unacceptable sheet metal deformation and releasing the at least one of the plurality of nodes identified, so as to allow the identified nodes to move as the sheet metal assumes a relaxed state. The method also includes redesigning the initial binder surface based on the relaxed state to obtain a modified binder surface.

8 Claims, 11 Drawing Sheets

METHOD FOR DESIGNING A BINDER RING SURFACE FOR A SHEET METAL PART

Cross-Reference To Related Application

This application is related to U.S. Pat. No. 5,128,877, issued to Tang and assigned to the assignee of the present invention.

1. Technical Field

The present invention relates to a method for designing the surface of a binder ring of sheet metal tooling.

2. Background Art

The conventional draw process to form a sheet into a part is generally divided into two stages: the binder-set (binder-wrap) stage and the die closure stage. During the first stage, the sheet blank is gripped peripherally by the binder ring, which may have large curvatures deviating from a flat plane along two or more edges. The sheet is laid on the lower binder surface of a die and the upper binder ring comes down to set the binder shape, called the binder-set. In stage two, the punch travels down through the upper binder ring to form a contoured panel shape. In the die closure stage, the sheet is drawn between the binder ring and die and feeds into the interior shape to accommodate deep draw of the die closure.

It is necessary to compute the binder-set configuration of a sheet to be able to determine, with further analysis, the die closure in the second stage. The interior, ungripped portion of the sheet blank is virtually suspended. Its deformed shape is complex, a result of the weight of the sheet and as a result of the forced peripheral curvatures.

Sheet metal draw blanks which are not initially contacted by the draw punch in a centralized location of the suspended portion of the blank are likely to form wrinkles in the blank when fully drawn. In order to design the punch to contact the blank in such a centralized location for any particular application, the deformed shape of the blank must be known or determined as it is gripped in the binder-set stage to permit punch/die redesign. Additionally, an improperly designed binder ring surface will result in an excess of metal in the die cavity. This also leads to buckling of the sheet metal during the draw forming process.

The prior art has heretofore used essentially three teachings: (i) a trial and error method of making binders and punches/dies in physical plaster development, followed by rework and redesign until the desired shape is obtained; (ii) a geometric method using CAD based on fitted surface projections of the closest geometrical shape at each segment of the binder ring shape; and (iii) prediction of the binder wrap using a linear theory where the sheet deflection is assumed proportional to the applied load (a standard finite element program, such as NASTRAN, is commercially available to carry out the linear theory).

The first method is too expensive and time consuming, and the second method is too simplistic, leading to poor quality of draws because the mechanical properties, thickness and friction characteristics of the metal are not considered. Additionally, the binder-set predicted by the geometric method may deviate from the actual shape observed in the stamping plant, because the pure geometric method of surface fitting cannot take into consideration the mechanical properties of a sheet. As a result, a plaster shop was required to verify the designed binder ring surface. This not only required costly tryouts to compensate for inaccuracies, but also was incapable of obtaining optimum binder surface design. The last method is classic linear theory and is not valid to compute large deflections. An article representing the use of the last method is Takahashi et al, "Evaluation Methods of Press Forming Severity in CAD Applications", Computer Modeling of Sheet Forming Process, edit by Wang and Tang, THE METALLURGICAL SOC., pp. 37–50, 1985.

U.S. Pat. No. 5,128,877, issued to Tang and assigned to the assignee of the present invention, discloses a method of rapidly and accurately determining a binder-set blank shape for a non-symmetrical polygonal panel to be draw formed. The method includes essentially three steps: (a) forming a coordinate-based model of the blank outline of the panel; (b) specifying the displacement boundary condition of the binder wrap by nonlinear theory of mechanics, including: (i) defining arc sets to fit projections of opposite sides of the blank outline, having the greatest curvature, onto arc planes while incrementally bending the panel from a known flat condition to a binder surface condition and controlling each arc set to pass through a fixed point as it is changed in radius, (ii) interpolating from said arc sets to generate points on the unprojected opposite sides having such greatest curvature and thus defining the binder surface for the blank outline along such sides, (iii) defining the binder surface for the blank outline along sides having the least curvature by forcing such sides to lie on the binder surface through the act of proportionally reducing the gap or interference during the bending process in step (b)(i); and (c) determining the deformed shape of the panel suspended inside the punch opening line.

This method, however, is for evaluation of a given design of a binder ring surface for a sheet metal part in the first forming stage and consequently is not a design tool. Accordingly, it would be desirable to provide a flexible, rapid and accurate method for designing a binder ring surface which takes into consideration the mechanical properties of the sheet metal.

Summary Of The Invention

It is, therefore, an object of the present invention to provide a flexible, rapid and accurate method for designing a binder ring surface which takes into consideration the mechanical properties of the sheet metal.

In carrying out the above object and other objects and features of the present invention, a method is provided for aiding sheet metal forming tool design, the method for use with a computer including memory, and forming tools including a draw die, punch and binder having surfaces designed to form the sheet metal into a part, the sheet metal being represented as a mesh including a plurality of nodes. The method comprises evaluating an initial binder-set associated with an initial binder surface design during a first stage of forming the sheet metal in which at least one of the plurality of sheet metal mesh nodes is forced against the binder surface, and detecting an area of unacceptable deformation on the sheet metal mesh inside the die cavity. The method also comprises identifying at least one of the plurality nodes forced against the binder surface associated with the unacceptable sheet metal deformation, and releasing at least one of the plurality of nodes identified, so as to allow the identified nodes to move as the sheet metal assumes a relaxed state. The method also comprises redesigning the initial binder surface based on the relaxed state to obtain a modified binder surface.

A system is also provided for carrying out the method.

The advantages accruing to the present invention are numerous. For example, the method permits the design of an optimum, buckling free binder surface in significantly less time than possible with existing methodologies.

The above object and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
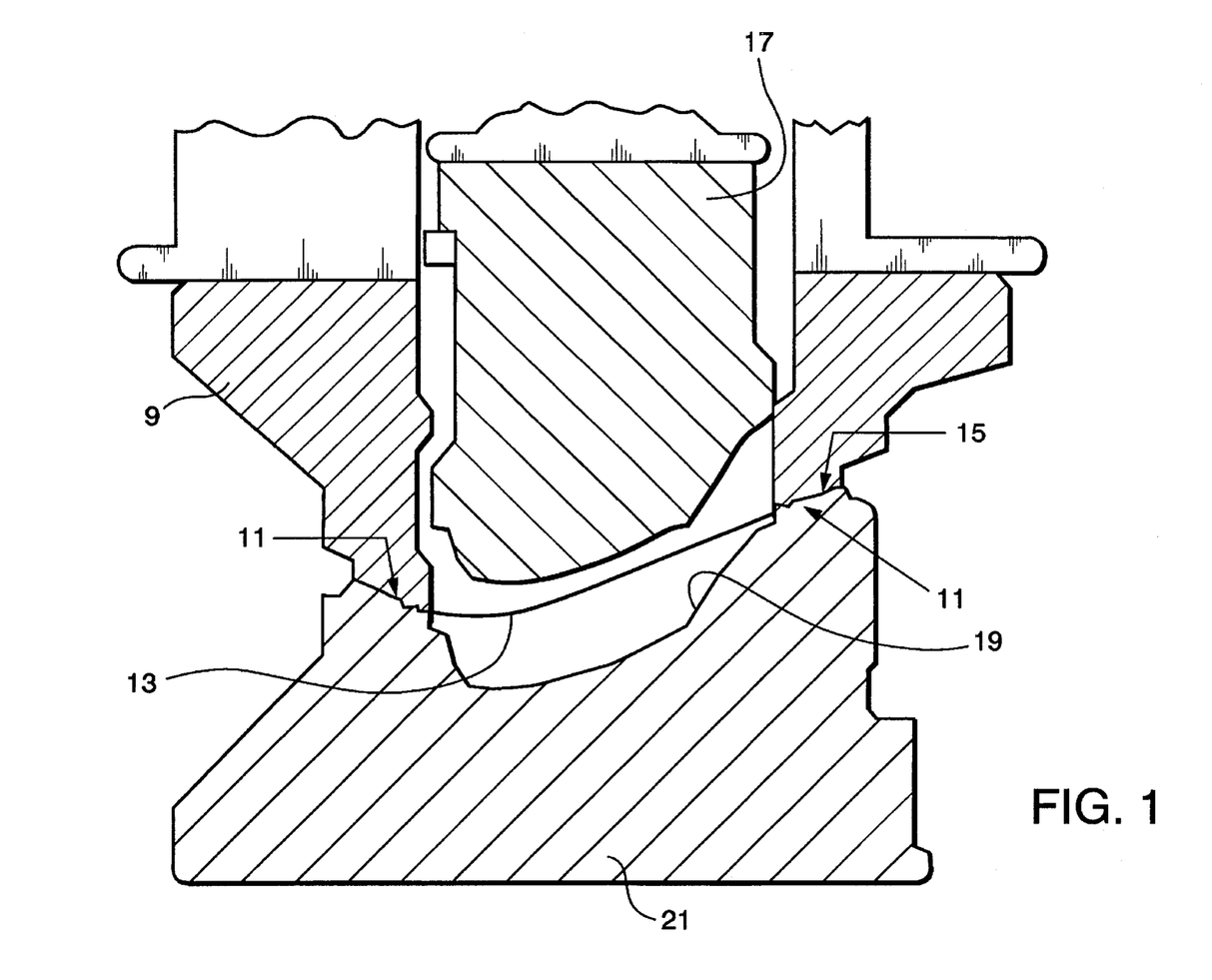
FIG. 1 is a sectional view of a deep draw die apparatus for an automotive body panel in the binder-set stage of the metal forming process, the punch being in an inactive state.
Figure 2:
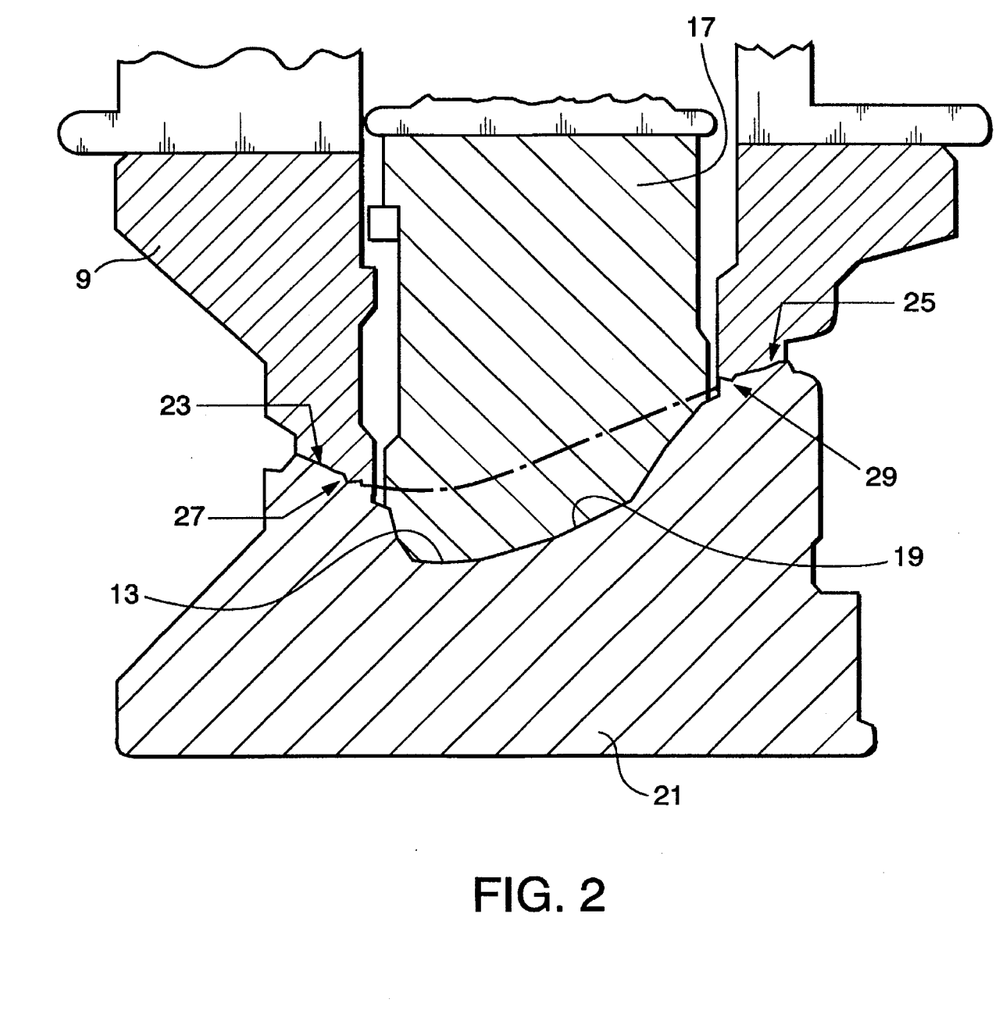
FIG. 2 is a sectional view of a deep draw die apparatus for an automotive body panel in the die closure stage of the metal forming process, the punch being in an active position lowered into the bottom cavity.

Referring now to FIGS. 1 and 2, there are shown sectional views of a deep draw die apparatus for an automotive body panel in the binder-set stage and the die closure stage, respectively, of the metal forming process. In the binder-set stage, best shown in FIG. 1, the binder ring 9 is closed and holds the perimeter of the sheet metal blank 13 against the lower die ring surface 15. The upper binder ring 9 lowers and sets the binder shape, also referred to as the binder wrap.

In the die closure stage best shown in FIG. 2, the punch 17 slides downward through the binder ring 9 and presses the sheet metal blank 13 against the central cavity 19 of the lower die 21, forming the contoured automotive body panel. In this stage, a surface contact problem with friction must be solved to ensure accurate draw forming results.

As shown in FIGS. 1 and 2, the lower die 21 is constructed not only to provide the central cavity 19 into which the sheet metal blank 13 is draw formed, but also has a ring surface 15 against which the upper binder ring 9 is lowered into contact prior to the draw form stage. To ensure that wrinkles do not occur in the interior suspended panel portion after draw forming, the binder wrapped peripheral portion of the sheet metal must be made properly. Certainly, the inner periphery of such binder ring must conform with the desired ultimate periphery of the body panel to be formed, but also preformed to avoid wrinkling as the panel is drawn into the cavity 19 from the binder wrapped surfaces. The contours and shape of the suspended portion must be known in advance prior to the draw forming operation so that the upper punch is restricted to initially contact the suspended panel portion at a generally central location first. Knowledge of the exact suspended shape of the inner panel portion is important to know whether any off-center contact will be made between the upper punch 17 and the suspended portion. With such prior knowledge, adjustments can be made to the slope of the binder surface to allow the suspended panel portion to be contacted by the upper die at a central location. FIG. 2 also shows the blank edge starting positions 23, 25 and the blank edge finish positions 27, 29.

Figure 3:
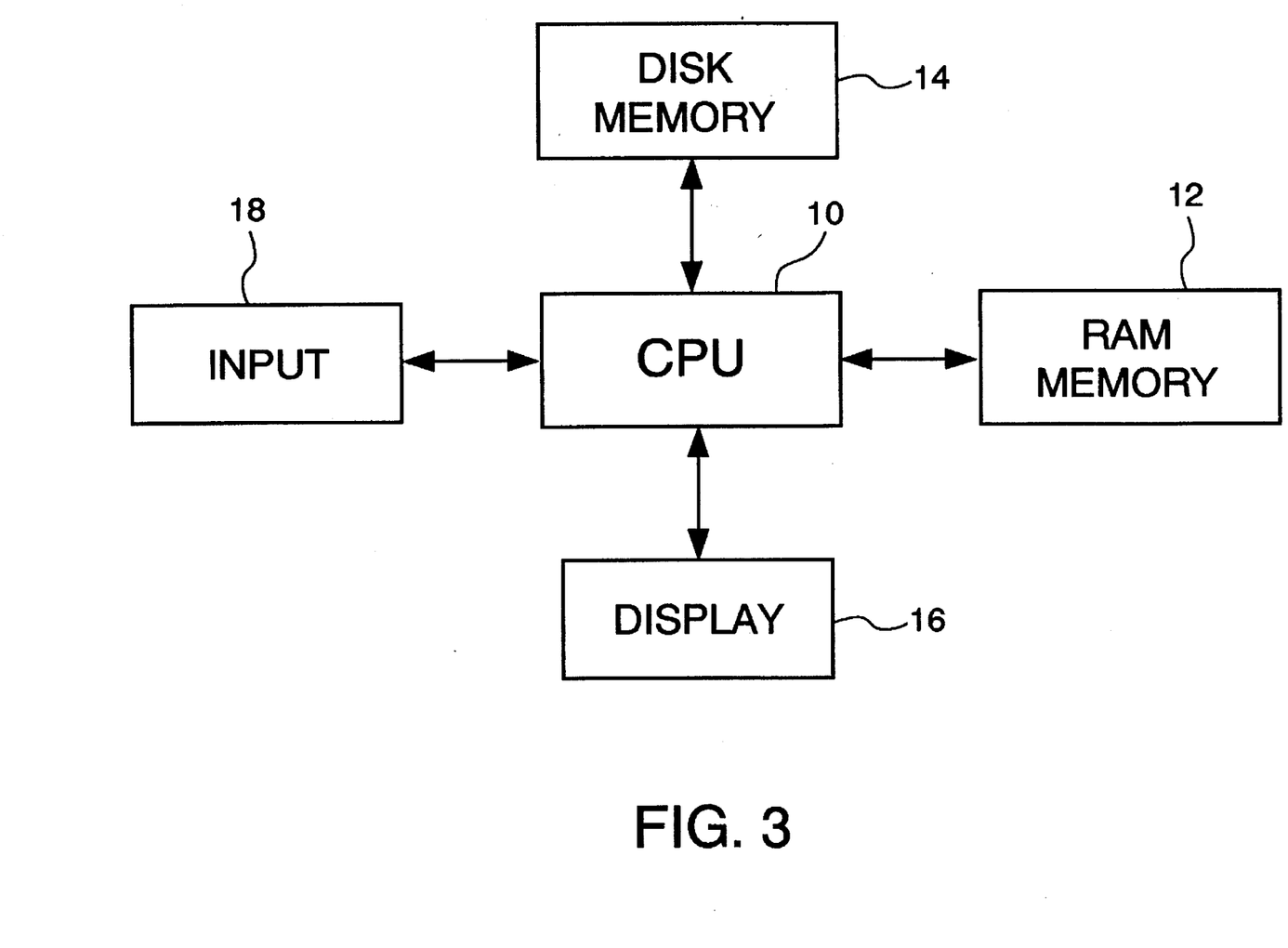
FIG. 3 is a block diagram of a computer for use with the present invention.

The method according to the present invention is preferably carried out on a computer, such as a IBM RS6000 work station, the functional block diagram of which is illustrated in FIG. 3. As shown in FIG. 3, the computer includes a CPU 10, a RAM or core memory 12, disk memory 14, a display or similar output 16, and an input means 18, such as a keyboard. The computer simulates the formation of automobile body panels from sheet metal.

Figure 4:
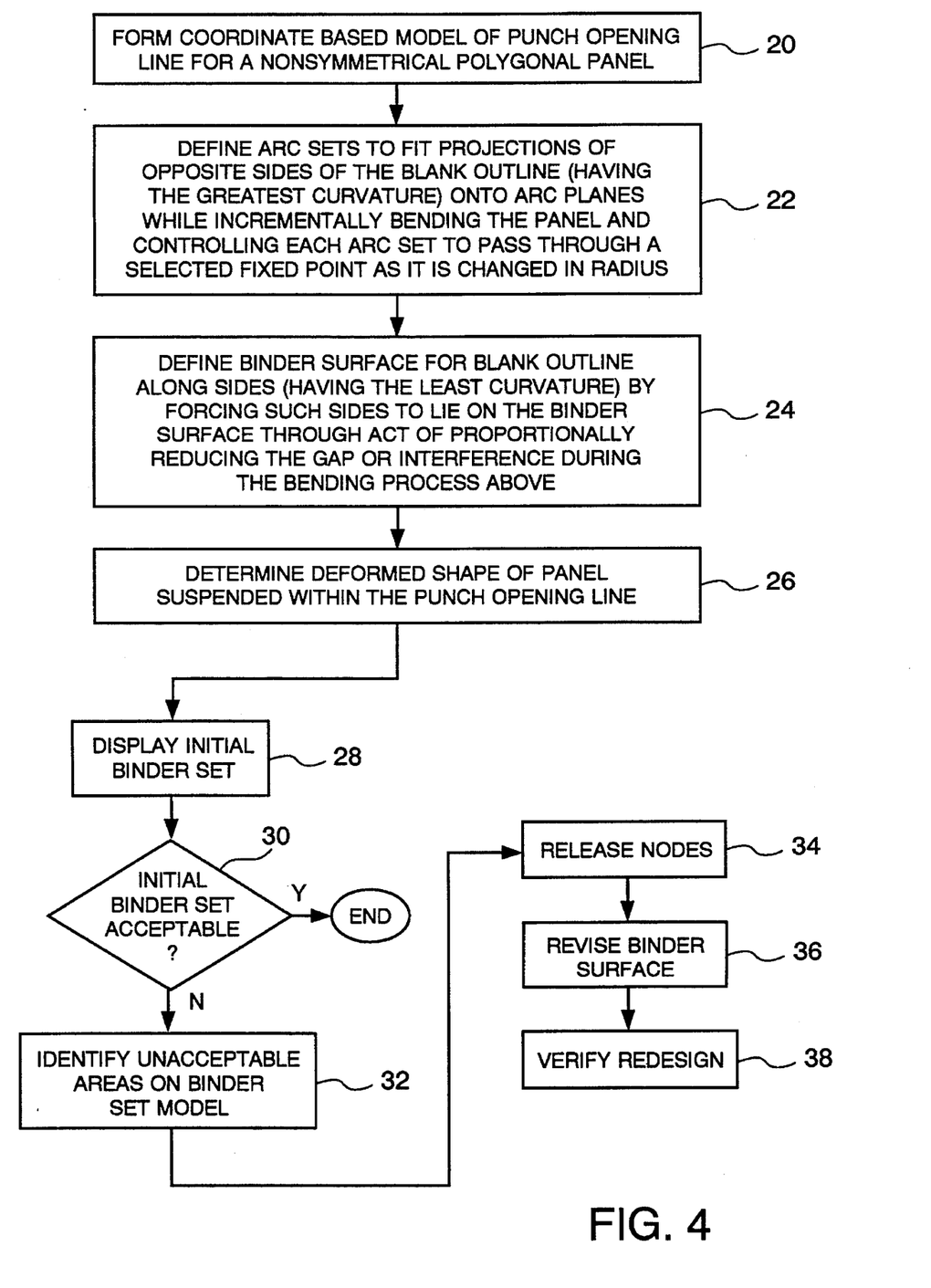
FIG. 4 is a block diagram of the abbreviated process steps of this invention.

Referring now to FIG. 4, there is shown a flow chart illustrating the steps of the method of the present invention. At step 20, a coordinate-based model of a blank outline (i.e. the periphery of a panel) and punch opening line (i.e. the boundary of a hole through which the punch travels) is formed for a non-symmetrical polygonal body panel. The coordinate-based model, best shown in FIG. 5, is formed by input point data to generate a blank outline 50 and a punch opening line 52.

Figure 5:
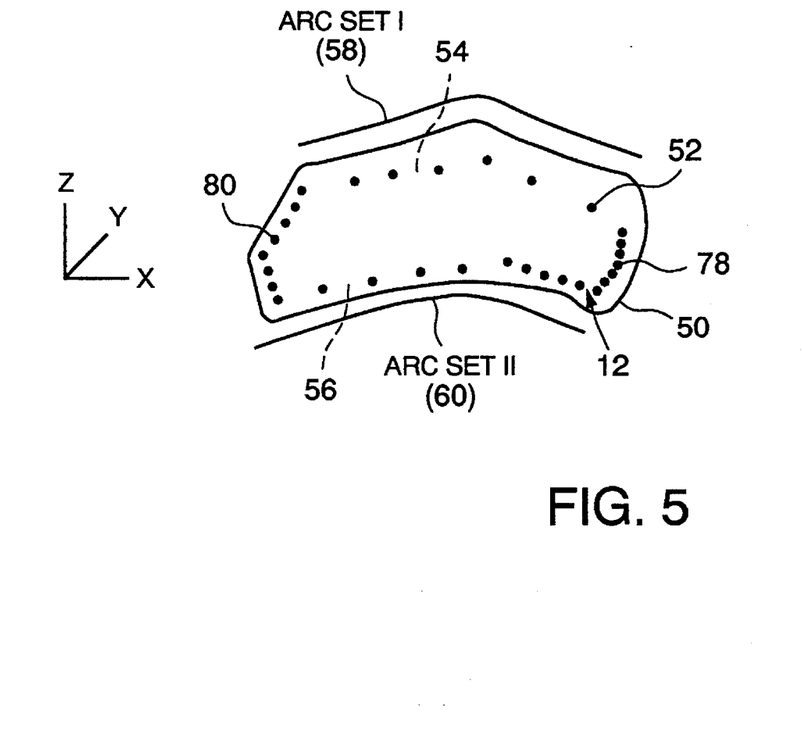
FIG. 5 is a schematic representation of one example of a coordinate based model utilized for the first step of the process described herein.

With continuing reference to FIGS. 4 and 5, at step 22 boundary conditions for the two opposite sides 54, 56 or edges of the blank outline having the greatest curvature, when binder wrapped, are developed by hypothetically incrementally bending the panel from a known flat condition to the binder wrapped condition, while controlling arc sets 58 and 60 to pass through a fixed anchor point A (see FIG. 6), as it is changed in radius. For purposes of this discussion, the term arc set refers to a composite of straight line and circular arc segments that conform to a complete projected panel side. To do this, the sides 54 and 56 with the greatest curvature are projected onto artificial planes 62 and 64 (see FIG. 7). Lines 63 and 65 of FIG. 7 illustrate interpolation from arc planes I and II, respectively. The panel is first transposed to a parallel artificial position passing through the selected anchor point A, which is selected with judgment to allow the panel to be contoured to the binder wrap configuration without excessive vertical displacement. In this artificial condition, the panel is then incrementally bent to a binder wrapped condition, which defines coordinates at straight and circular arc segments 66 along such side in the projection plane (see FIG. 6).

Figure 6:
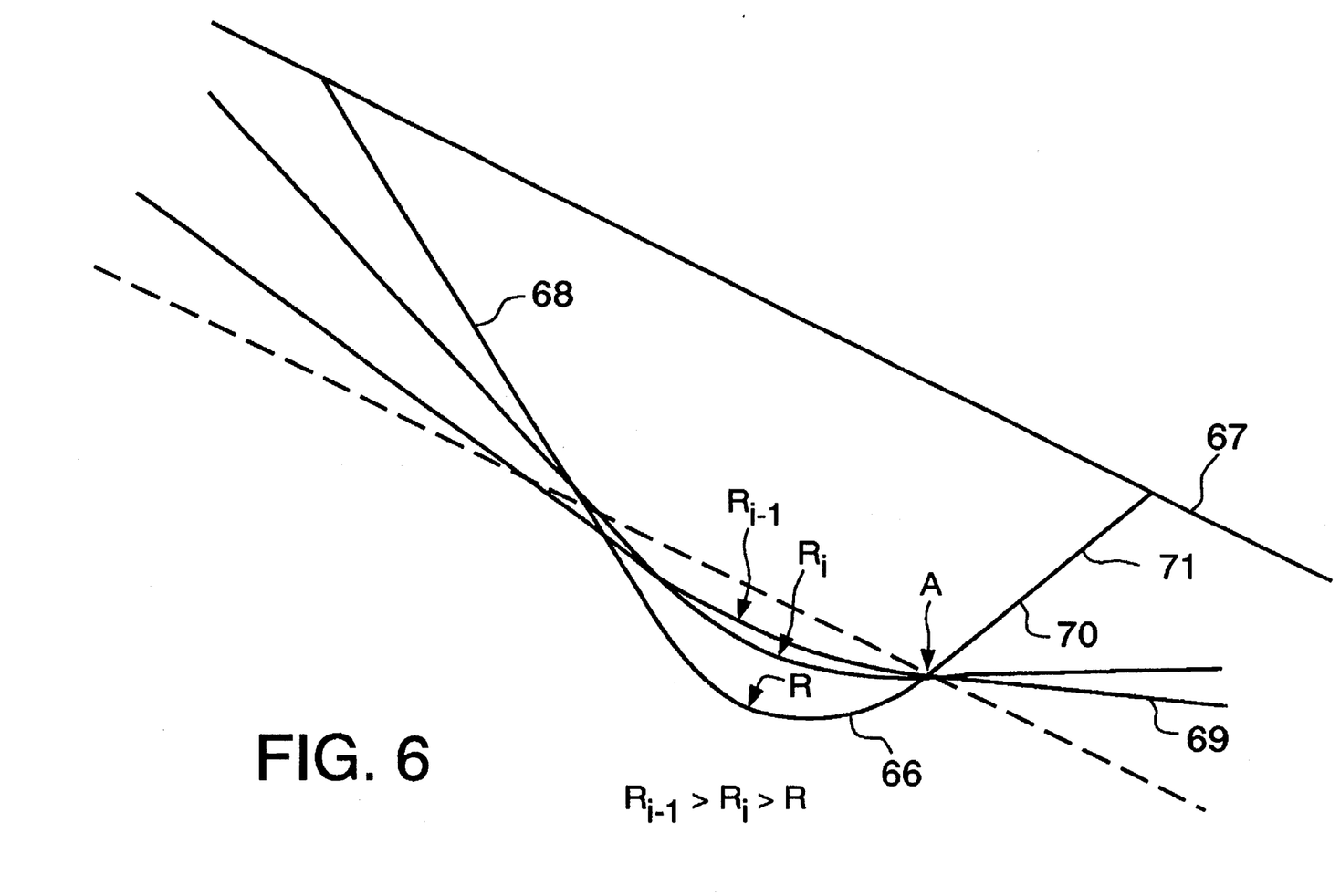
FIG. 6 is a schematic representation of a single arc segment utilized to define an arc set along one side having the greatest curvature.
Figure 7:
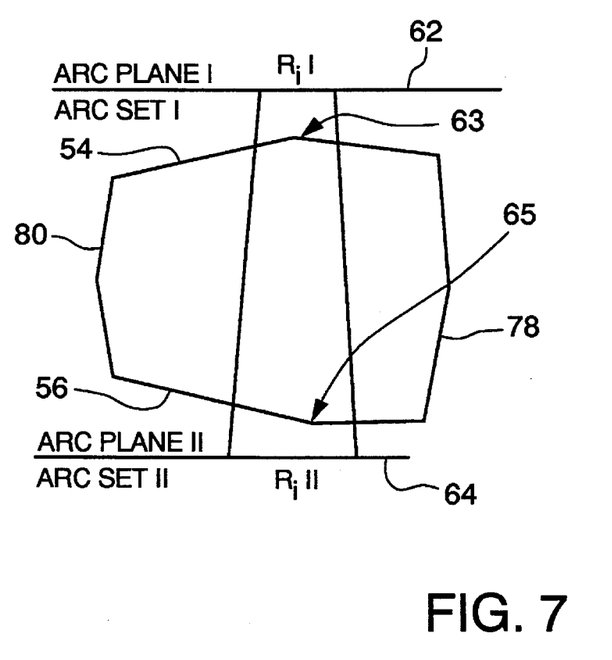
FIG. 7 is a plan view of the coordinate based model of FIG. 5.
Figure 8:
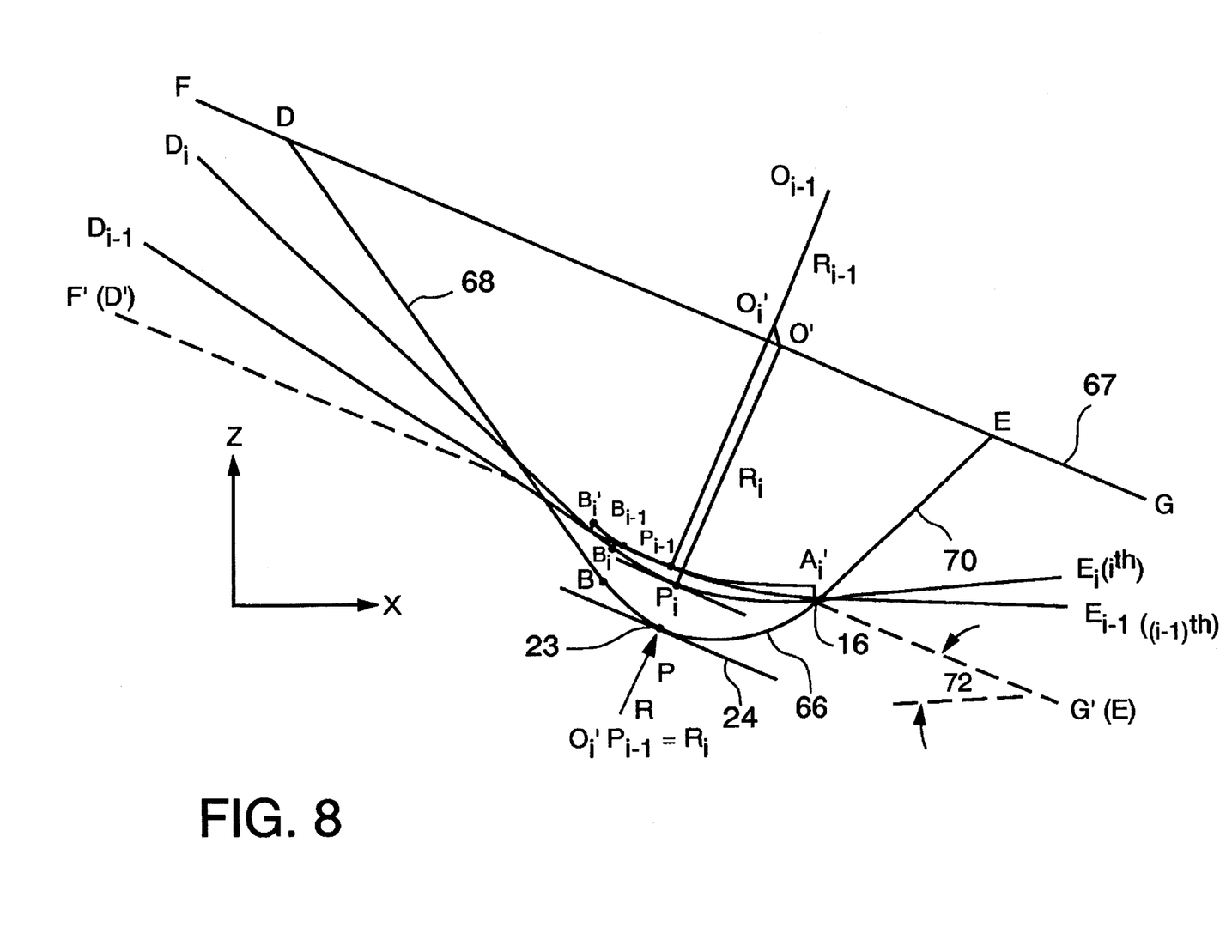
FIG. 8 is an enlarged view of two straight line segments and one arc segment illustrating intermediate position of bending of such segment.

With reference now to FIGS. 6–8, if the side is a composite of curves, additional circular arc segments are used for such curves, but point A remains the same for all the segments or curves. The circular arc segment 66 forms an arc set in conjunction with two straight line segments 68 and 70, as shown in FIG. 6. Each arc set has an anchor point A which coincides with the end point of the circular arc 66. The line joining the anchor points A on the two arc sets is called the anchor line which is perpendicular to the arc planes. The purpose for an arc set, with a specified slope 72, passing the anchor point is that the sheet during the binder analysis is properly supported (without rigid body motion or over-constraint). The specified slope 72 is equal to the tipping angle of the sheet at its initial position on the binder surface. An arc set containing only one circular arc is utilized in FIGS. 6 and 8; two tangent lines 68 and 70 (best shown in FIG. 6) are illustrated as drawn to the circular arc with a radius R in a specified slope at a point P with the arc passing the anchor point A.

In the initial position 67 of the sheet, the straight line FDEG is the intersection of the sheet at its initial position with one of the arc set planes. For convenience in computation, it is translated to F'G' passing the anchor point A and the bending process is started from this position. At an intermediate position 69 (i-1), circular arc $B_{i-1}P_{i-1}A$ has a radius $R_{1-1}$ and the tangent at the point $P_{i-1}$ is parallel to FG. Shown are two tangent lines are $D_{1-1}B_{1-1}$ and $AE_{1-1}$. Note that the arc passes the anchor point A and the arc length does not change.

From the intermediate position 69 to a more advanced intermediate position, the circular arc will have a radius $R_i$. A circular arc $B'_iP_{i-1}A'_i$ with radius $R_i$ is drawn in its center $O'_i$ lies on the line $O_{i-1}P_{i-1}$. Therefore, the tangent to the circular arc with a radius $R_i$ at the point $P_{i-1}$ is parallel to FG. We then translate (without any rotation) the arc $B'_{i-1}P_{i-1}A'_i$ to $B_iP_iA_i$ so that is passes the fixed point A and the tangent at $P_i$ is still parallel to FG. Note that the center of the circular arc is translate from $O'_1$ to $O_i$ which determines $\overline{X}_o$ and $\overline{Z}_o$. Two tangent lines $D_iB_i$ and $AE_i$ can be drawn and $D_iB_i$ which is equal to DB and $AE_i$ which is equal to AE. At any intermediate step, the equation for a circular arc is:

$$(X_{i-1}-X_o)^2+(Z_{i-1}-Z_o)^2=(R_{i-1})^2$$

At the subsequent step it becomes $$(X_i-\overline{X}_o)^2+(Z_i-\overline{Z}_o)^2=(R_i)^2$$

where $\overline{X}_o$ and $\overline{Z}_o$ are so determined that the arc passes a fixed point and the slope at a point on the arc is specified. Thus, the increment displacement boundary condition is:

$$\Delta Z=Z_i-Z_{i-1}$$

For sure convergence of the numerical solution in each incremental step, $\Delta Z$ is not allowed to be greater than a specified value, such as two inches. Thus, as shown in FIG. 8, the arc will proceed from an initial position 67 with an infinite radius (straight line), to a radius of $R_{i-1}$, to a radius of $R_i$, and finally to a radius R at a final position 71.

Figure 9:
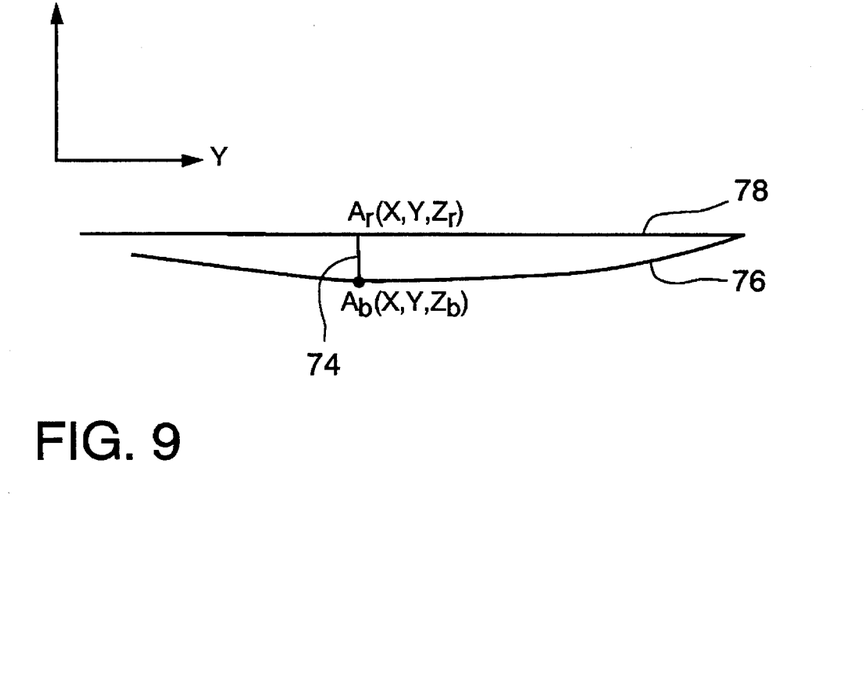
FIG. 9 is a schematic representation of the binder surface for the blank outline along the sides having the least curvature; such sides are forced to lie on the binder surface by proportionally reducing the gap during the bending process.

Referring now to FIGS. 4 and 9, there is shown the method for determining the gap 74 of interference between the binder surface 76 and the points on sides 78 and 80 of the blank outline having the least curvature. As shown by step 24 of FIG. 4, such sides are forced to lie on the binder surface 11 (FIG. 1) by proportionally reducing the gap 74 or interference during the bending process as follows.

The boundary condition for a point $A_r$ on the edge of the rolled surface 78, and the least curved side of the blank outline is $\Delta Z=Z_b-Z_r$, where $Z_b$ is the Z coordinate of the point $A_b$ on the binder surface 76 with the same X and Y coordinates as those of the point $A_r$. Since there are 'n' steps in the bending process to reach the final shape, $\Delta Z/n$ is imposed as the incremental boundary condition for each step at a point on the edge with less curvature.

Figure 10:
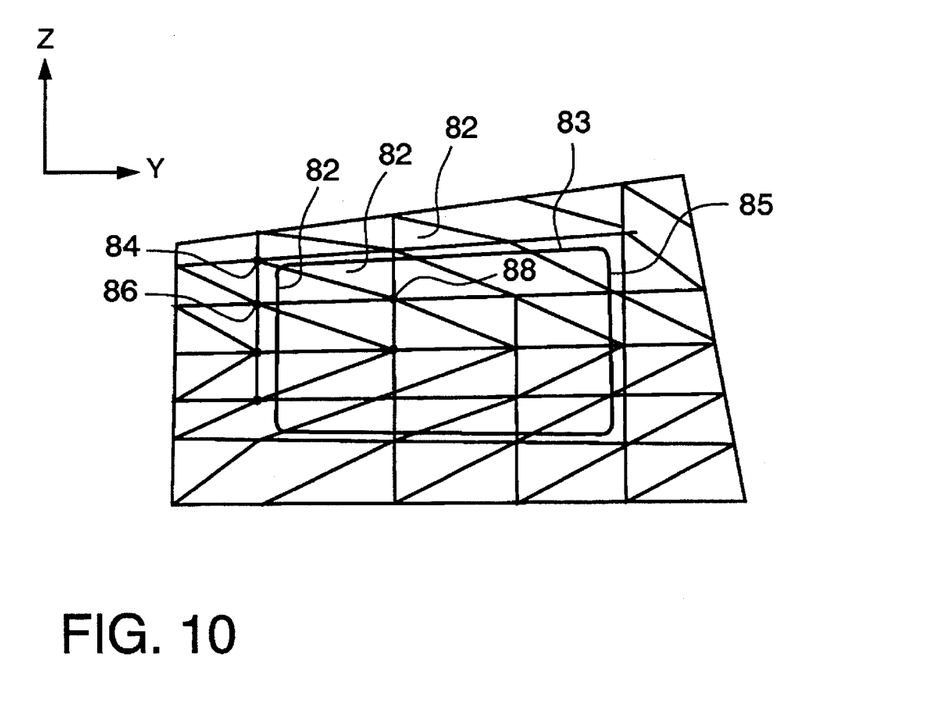
FIG. 10 is a plan view of the panel model subdivided into triangular shapes for use in determining the deformed shape of the panel suspended within the punch opening line.

Referring once again to FIG. 4, the deformed shape, according to step 24, comprises determining the displacement increments at nodes N of segments into which the blank, including the suspended panel portion, is divided (see FIG. 10). This determination may be carried out by solving a boundary value problem in incremental steps because of the nonlinear characteristics of large deflections of the panel. The incremental displacement boundary conditions for points on the blank outline 83 (see FIG. 10) are established following steps 22 and 24 and the incremental force is due to the weight of the panel. The boundary value problem is formulated based on the nonlinear shell theory, and the finite element method is used to compute the deformation inside the punch opening line. In the shell theory, the metal sheet is modeled as a thin shell structure.

The undeformed metal surface of the shell becomes the reference surface. With the thin shell assumption, the state of stress is approximately planar, i.e., the effects of transverse shear stresses and normal stress acting on the reference surface may be neglected. Using the shell theory, the three dimensional sheet may be represented by a surface (its middle surface). The strain at a point in the sheet is expressed:

$$\epsilon_{60\,\beta}=\gamma_{60\,\beta}+z\kappa_{\alpha,\,\beta}(\alpha,\,\beta=1,2)$$

where $\gamma_{60\,\beta}$ is the strain on the middle surface and $\kappa_{\alpha,\,\beta}$ the curvature change of the middle surface and z the distance from the middle surface.

The undeformed middle surface is represented by:ps $$x=x(\theta^\gamma)$$

$$(\alpha=1,2)$$

and the deformed middle surface is represented by:

$$\overline{x}=\overline{x}(\theta^{60}),$$

$$\overline{x}=x+u$$

The middle surface strain is computed by:

$$\gamma_{\alpha\beta}=(\overline{\alpha}_{\alpha\beta}-\alpha_{\alpha\beta})/2$$

where $$\alpha_{\alpha\beta}=\frac{\partial x}{\partial\theta^\alpha}\cdot\frac{\partial x}{\partial\theta^\beta}$$

and $\overline{\alpha}_{\alpha\beta}$ is computed by the same equation except x is replaced by $\overline{x}$. The curvature change is expressed by:

$$k_{\alpha\beta}=-(\overline{b}_{\alpha\beta}-b_{\alpha\beta})+(CORR_{STR})$$

where $CORR_{STR}$ is a correction due to stretching and where $$b_{\alpha\beta} = n \cdot \frac{\partial^2 x}{\partial \theta^\alpha \partial \theta^\beta}$$

where n is the normal to the middle surface and $\bar{b}_{\alpha\beta}$ is computed by the same equation except n replaced by $\bar{n}$ and x is replaced by $\bar{x}$. The stress increment is expressed by the stain increment:

$$\Delta\sigma^{\alpha\beta} = D^{\alpha\beta\xi\zeta} \Delta_{e\,\xi\zeta}$$

where D is the material tensor for the panel. Applying the principle of virtual work, one establishes the equilibrium for the current configuration as following:

$$\int\int_A\int_h \sigma^{\alpha\beta}\delta\epsilon_{\alpha\beta}\, dzdA - \int_A f^i \delta u_i dA$$

where the strain $\delta\epsilon_{\alpha\beta}$ is due to the virtual displacement $\delta u_i$, A is the total area of the panel surface, h is the deformed thickness, and $f^i$ is the weight of the panel per unit area of the surface.

As best shown in FIG. 10, the finite element method (displacement method), as mentioned earlier, is carried out by having the middle surface of a sheet subdivided into small elements, and in this case the elements are triangles 82. The vertices 84, 86 and 88 of the triangles are called nodal points or nodes. Within each triangle 82, a deformed shape is assumed in terms of the displacements and displacement gradients at its three nodes. From the shell theory, the strains are expressed in terms of the node displacement; therefore, the stresses can be expressed in terms of the nodal displacements by using the stress/strain relationship. Using the equilibrium condition mentioned previously, the following equilibrium equation for the panel can be established:

$$K_t \Delta U = \Delta F$$

where $K_t$ is the tangent stiffness matrix and $\Delta F$ is the increment of the applied force due to weight of the panel. Note that the equilibrium equation is written in the incremental form because this is a nonlinear problem and a step-wise linearization process is used. A portion of the elements in the displacement incremental vector $\Delta U$ is known from steps 22 and 24; therefore, the rest of the elements in $\Delta U$ can be solved rather quickly because of rapid convergence of the method. Adding all of the displacement increments, the final shape of the panel inside the punch opening line 85 is thus computed at step 26 of FIG. 4.

Convergence may be impaired for different reasons. For example, snap-through-type buckling may occur. Close to the onset of buckling, the tangent stiffness matrix in the Newton-Raphson method is ill-conditioned or singular because it reflects the stiffness of an unstable structure. This causes the iterative solution process to diverge because of the large nodal displacement increments that are computed based upon this matrix. U.S. patent application Ser. No. 08/143,024, filed on Oct. 28, 1993, titled "Method and Apparatus For Predicting Post-Buckling Deformation of Sheet Metal" U.S. Pat. No. 5,390,127 and assigned to the assignee of the present invention, discloses a method for addressing and resolving these convergence problems, so as to permit predicting of post-buckling deformation of the sheet metal.

It is desirable that when an assumed final radius R is reached, it is checked to see if conformance with the binder surface has been achieved. If not, all sides of the sheet are adjusted so that the panel will lie on the binder surface of the die. Again, using the nonlinear shell theory and the finite element method, the additional deformation due to the adjustment is carried out.

The above-described method permits detection of buckling on a sheet with a given binder surface design. By extending that method according to the present invention, a binder surface for a buckling free binder-set may be designed. Finite element aided binder design according to the present invention utilizes finite element analysis during the tool design stage for binder development, which helps draw development engineers fix binder surfaces with local buckling problems, and also design the binder surfaces regionally when several control points are given.

Figure 11A:
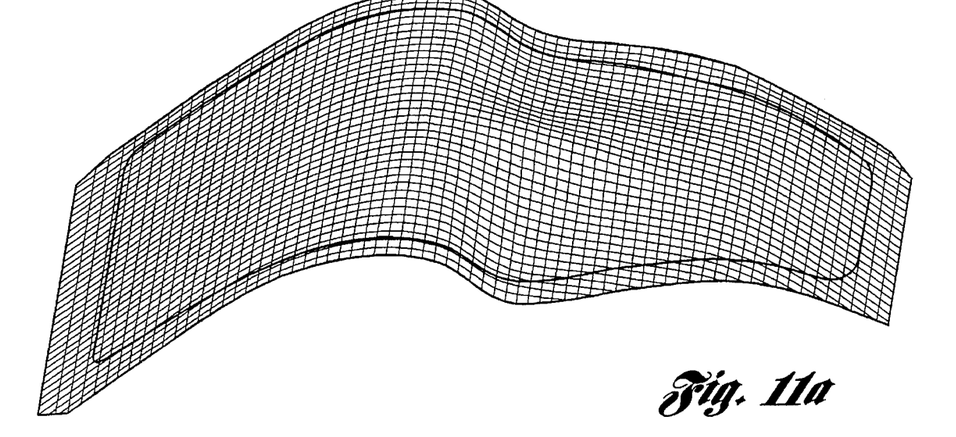
FIGS. 11a–11c illustrate a binder-set from an initial binder ring surface, the difference between the initial design and the design revised according to the present invention, and a revised binder-set free of any buckling, respectively.

Once the final shape of the panel inside the punch opening line is computed at step 26, that initial binder-set can be displayed graphically, for example on an engineering work station, at step 28. For example, FIG. 11a is a graphical illustration of a binder-set for an automobile door outer panel. At step 30, a determination is made whether or not the binder-set resulting from the initial binder design is acceptable, and if not, at step 32 the areas having wrinkles, or buckles, and other unacceptable deformations are identified. Generally, the presence of buckles is due to an excess amount of sheet metal in the die cavity. During the binder-set stage, the sheet metal nodes proximate the edges of the blank are essentially being forced to the binder ring surface. When buckles are formed at the binder-set stage, the normal reaction forces on the binder surface increase. This results in high stress and high strain on the blank, for example in a reverse curve area, because the blank is over constrained. Thus, by considering the stress-strain distribution on the blank, the areas on the binder in need of redesign can be identified.

With continuing reference to FIG. 4, once the areas to be changed are identified, the constraints on the sheet metal blank nodes of the finite element model are released at step 34, such that the sheet metal blank nodes at those areas are no longer being forced to the binder ring surface. By releasing these nodes, the sheet metal becomes unconstrained and is thus allowed to go to a natural, relaxed shape. Once released, the blank in the die cavity takes a relaxed form without buckles. In some cases, however, releasing the nodes only reduces the severity of buckling problems since, in some areas, the unsevere buckle is needed to provide enough material at die closure.

As shown in FIG. 4, at step 36 the binder surface is next revised. This includes repeating the evaluation method described above with reference to steps 20–26 to compute the binder-set and to determine the deformed positions of the freed nodes. The binder surface is also represented as a mesh of nodes. Certain binder surface nodes, i.e. those nodes associated with the sheet metal nodes released, are then repositioned to match the positions of the freed nodes. In this way, the binder surface is redesigned to match or mate with the sheet metal surface in its relaxed state.

Figure 11B:
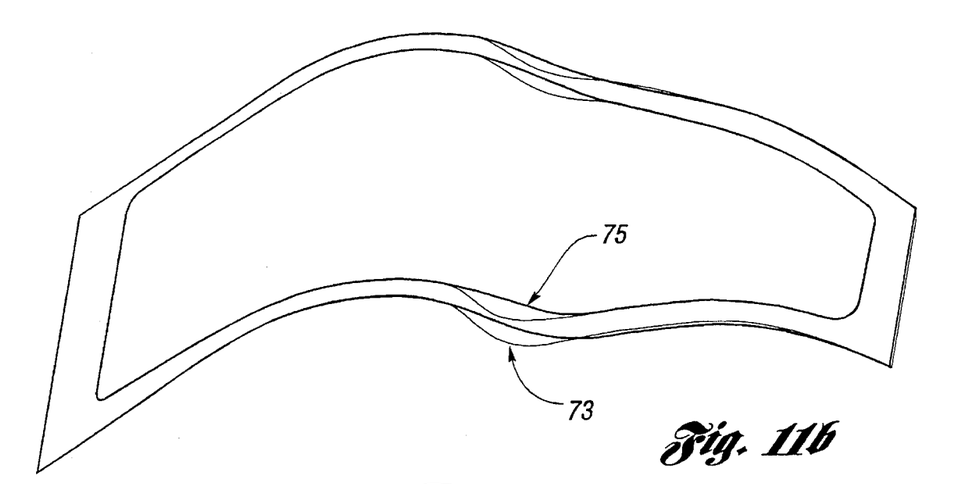
Figure 11C:
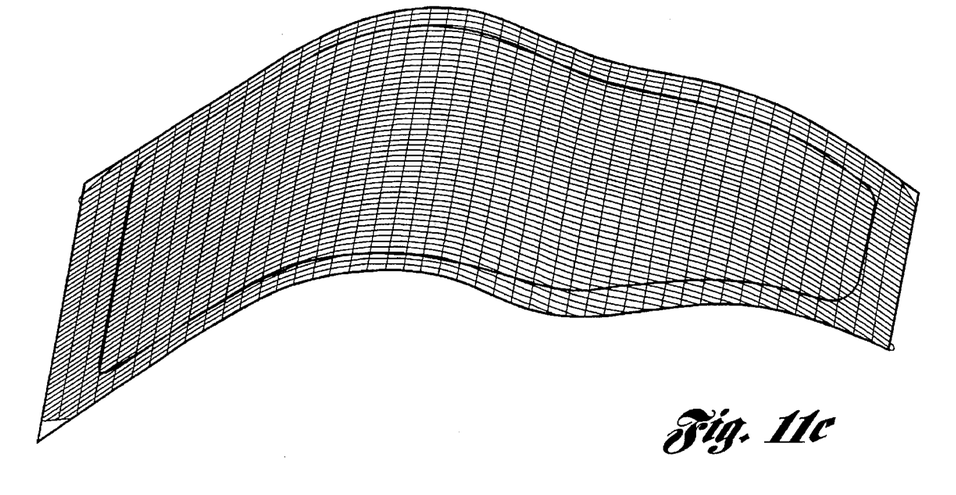

As a verification of the revised binder surface, the evaluation program is executed once again at step 38 to detect any buckling. FIG. 11b illustrates difference between the initial design 73 and the revised design 75, and FIG. 11c illustrates a revised binder-set free of any buckling. Thus, this is the final design of the binder surface for the door outer panel. The whole design process, including three computer evaluations, takes only a few hours total, and eliminates timely and costly soft tool binder modifications.

Figure 12A:
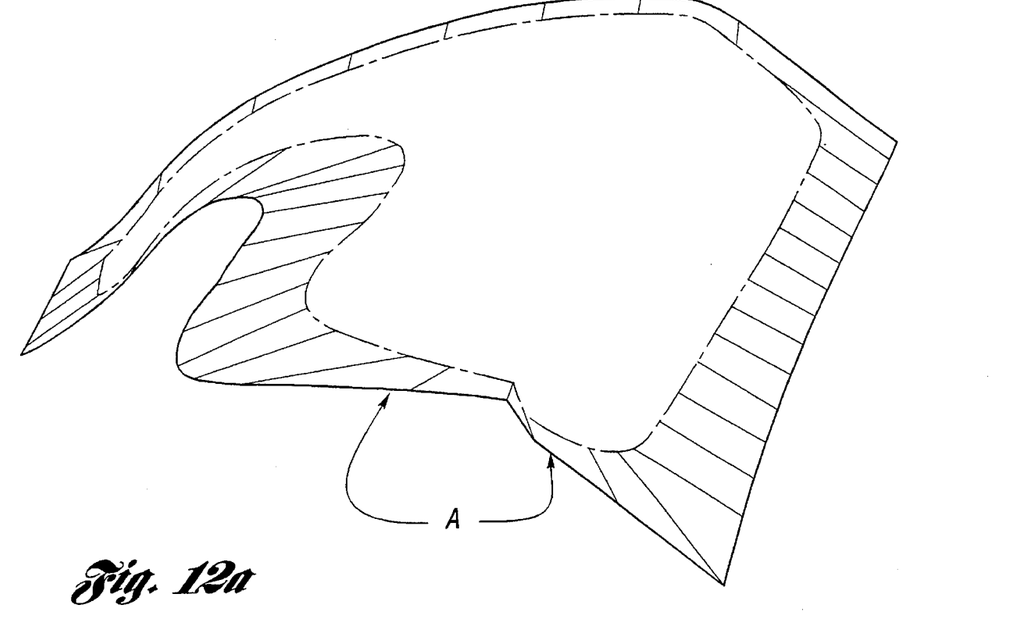
FIGS. 12a–12b illustrate a binder-set of the initial binder ring design for an automobile fender having a bad design, and a binder-set for the binder ring after being modified according to the present invention, respectively.
Figure 12B:
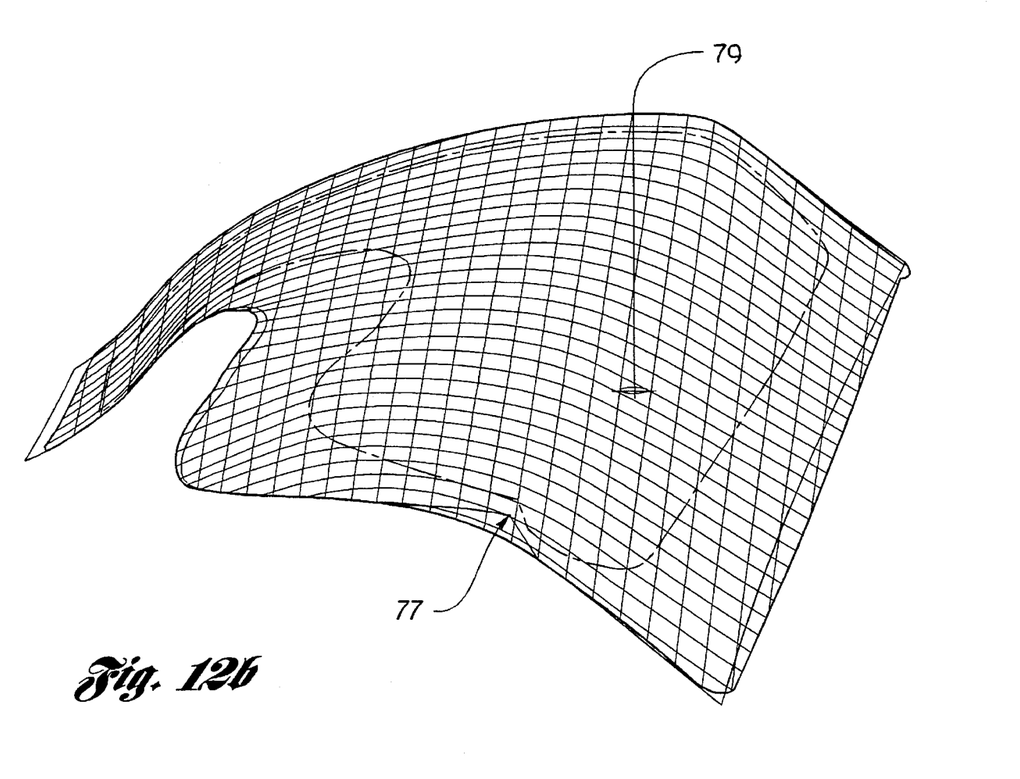

Referring now to FIGS. 12a and 12b, there is illustrated an example of a use of the present invention for local design and modification. More specifically, FIG. 12a illustrates an initial design for a fender outer panel which is not designed properly at area A. After the method of the present invention as described above was applied, the binder-set was smooth and acceptable, as shown in FIG. 12b. FIG 12b also shows the original design 77 and the first contact point 79.

Figure 13A:
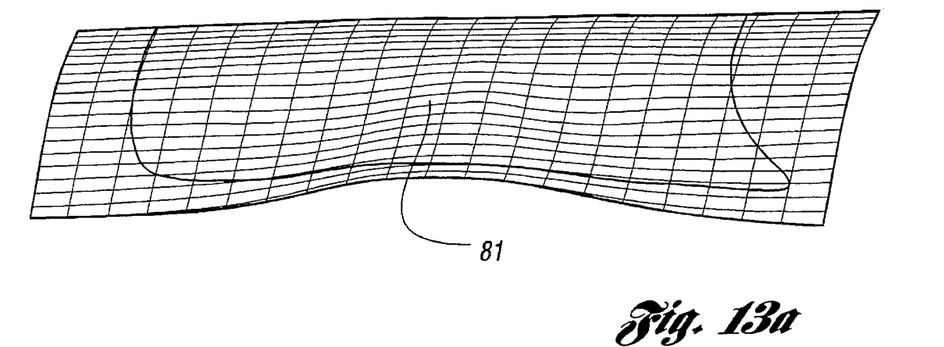
FIGS. 13a–13c illustrate an inadequate initial binder design for an automobile hood, a design requirement for the hood, and a modified binder design satisfying the design requirement.
Figure 13B:
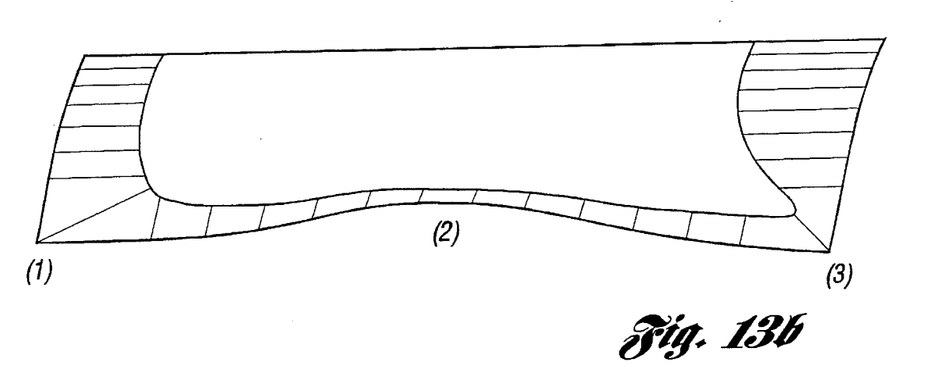
Figure 13C:
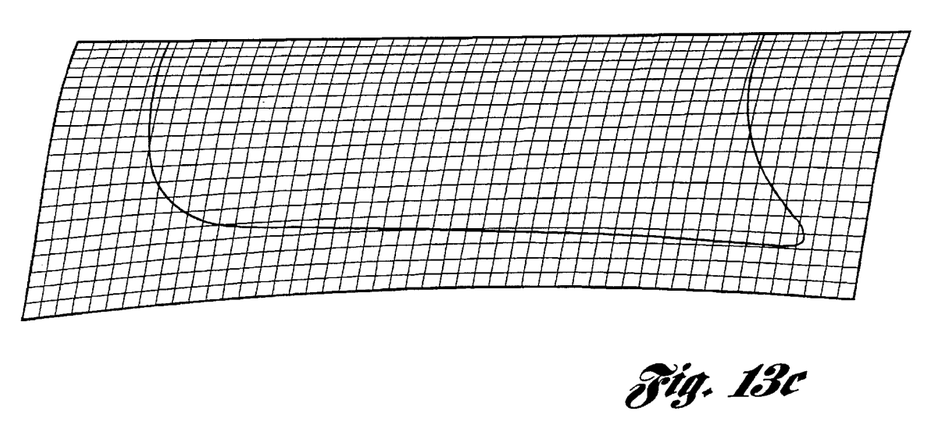

Reference to FIGS. 13a–13c, which illustrate an example of a use of the present invention for regional design and modification. More specifically, FIG. 13a illustrates an initial design for a hood outer panel that is inadequate due to buckling 81. FIG. 13b illustrates a design requirement for the binder surface. In this case, an acceptable binder surface is one in which the binder-set passes through the given control points 1–3. After the method of the present invention as described above was applied, the revised binder-set satisfies the control point requirements and without buckling, as shown in FIG. 13c.

It is understood that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

We claim:

1. A method for aiding sheet metal forming tool design, for use with a computer including memory, and forming tools including a draw die, punch and binder having surfaces designed to form the sheet metal into a part, and a die cavity, the sheet metal having a surface and being represented as a mesh including a plurality of nodes, the method comprising:

evaluating an initial binder-set associated with an initial binder surface design during a first stage of forming the sheet metal in which at least one of the plurality of sheet metal mesh nodes is forced against the binder surface;

detecting an area of unacceptable deformation on the sheet metal mesh in the die cavity;

identifying the at least one of the plurality nodes forced against the binder surface associated with the unacceptable sheet metal deformation;

releasing the at least one of the plurality of nodes identified, so as to allow the identified nodes to move as the sheet metal assumes a relaxed state; and redesigning the initial binder surface based on the relaxed state to obtain a modified binder surface.

2. The method of claim 1 further comprising determining a new position for each of the released nodes.

3. The method of claim 2 wherein the binder surface is represented as a mesh including a plurality of nodes, the method further comprising:

identifying a plurality of binder surface nodes against which the sheet metal mesh nodes are forced during the first stage; and repositioning the binder surface nodes based on the surface determined by the new positions of the released sheet metal mesh nodes such that the redesigned binder surface mates with the sheet metal surface in the relaxed state.

4. The method of claim 1 wherein the sheet metal mesh nodes are conditionally released so that movement of the released nodes is restricted to conform with predetermined design requirements for the sheet metal part being formed.

5. A system for aiding sheet metal forming tool design, for use with forming tools including a draw die, punch and binder having surfaces designed to form the sheet metal into a part, the sheet metal being represented as a mesh including a plurality of nodes, the system comprising:

means for evaluating an initial binder-set associated with an initial binder surface design during a first stage of forming the sheet metal in which at least one of the plurality of sheet metal mesh nodes is forced against the binder surface;

means for detecting an area of unacceptable deformation on the sheet metal mesh;

means for identifying the at least one of the plurality nodes forced against the binder surface associated with the unacceptable sheet metal deformation;

means for releasing the at least one of the plurality of nodes identified, so as to allow the identified nodes to move as the sheet metal assumes a relaxed state; and means for redesigning the initial binder surface based on the relaxed state to obtain a modified binder surface.

6. The system of claim 5 further comprising means for determining a new position for each of the released nodes.

7. The system of claim 6 wherein the binder surface is represented as a mesh including a plurality of nodes, the system further comprising:

means for identifying a plurality of binder surface nodes against which the sheet metal mesh nodes are forced during the first stage; and means for repositioning the binder surface nodes based on the surface determined by the new positions of the released sheet metal mesh nodes such that the redesigned binder surface mates with the sheet metal surface in the relaxed state.

8. The system of claim 5 wherein the sheet metal mesh nodes are conditionally released so that movement of the released nodes is restricted to conform with predetermined design requirements for the sheet metal part being formed.

* * * * *